(12) United States Patent
Choi

(10) Patent No.: US 8,023,185 B2
(45) Date of Patent: Sep. 20, 2011

(54) TRANSMISSION SCREEN FOR STEREOSCOPIC IMAGES

(76) Inventor: Hae-Yong Choi, Seoul (KR)

( * ) Notice: Subject to any disclaimer, the term of this patent is extended or adjusted under 35 U.S.C. 154(b) by 48 days.

(21) Appl. No.: 12/565,150

(22) Filed: Sep. 23, 2009

(65) Prior Publication Data

US 2010/0073767 A1 Mar. 25, 2010

(30) Foreign Application Priority Data

Sep. 23, 2008 (KR) .......... 10-2008-0093094
Jul. 22, 2009 (KR) .......... 10-2009-0066629

(51) Int. Cl.
*G03B 21/56* (2006.01)

(52) U.S. Cl. ........ 359/456; 359/376; 359/458; 359/462; 359/353; 359/464

(58) Field of Classification Search .......... 359/445, 359/452, 457, 458, 456, 462, 464–468, 475, 359/483, 485, 489, 577, 580–581, 586, 589; 427/8

See application file for complete search history.

(56) References Cited

U.S. PATENT DOCUMENTS

| | | | | |
|---|---|---|---|---|
| 2,776,598 A | * | 1/1957 | Dreyer .......... | 359/491 |
| 5,559,632 A | * | 9/1996 | Lawrence et al. .......... | 359/478 |
| 5,760,954 A | * | 6/1998 | Tatsuki et al. .......... | 359/452 |
| 5,800,907 A | * | 9/1998 | Yumoto .......... | 428/195.1 |
| 6,064,521 A | * | 5/2000 | Burke .......... | 359/443 |

OTHER PUBLICATIONS

Standards and Guidelines—Forensic Science Communications—Jan. 2005—vol. 7—No. 1 Scientific Working Group for Materials Analysis (SWGMAT).*

* cited by examiner

*Primary Examiner* — Clayton E Laballe
*Assistant Examiner* — Kevin Butler
(74) *Attorney, Agent, or Firm* — Bacon & Thomas, PLLC

(57) ABSTRACT

A transmission type screen for stereoscopic images having a transmission layer includes an incident surface having a gloss surface, a transmission layer having a refractive index less than 1.55, a transmissivity more than 60%, and an imaging surface having surface particle sizes of 40 to 400 mesh that avoids a hot spot. The imaging surface is formed on the final surface through which images are transmitted, so that the components operate in an organic fashion with respect to each other. The polarization degree of stereoscopic images is maximized thereby increasing the three-dimensional effect and the transmissivity, and enables viewers to view images clearly several times better than with a conventional screen.

6 Claims, 5 Drawing Sheets

PRIOR ART

PRIOR ART

500# TRANSMISSION SCREEN FOR STEREOSCOPIC IMAGES

BACKGROUND OF THE INVENTION

1. Field of the Invention

The present invention relates, in general, to a transmission type screen, and, more particularly, to a transmission screen for displaying stereoscopic images and which has a transmission layer for transmitting images while maintaining the degree of polarization thereof. The screen also is suitable for both stereoscopic images and general images with improved definition of the images.

2. Description for the Related Art

A transmission screen is a screen on which images are projected from the rear side of the screen and which allows a user to view images displayed on the front side of the screen.

Conventional transmission screens having transmission layers are transmission screens through which general images are transmitted, and include a medium having a refractive index, diffusion material within the medium, and diffusion material on the surface of the medium, so that in the course of transmitting polarized images, the images are not only diffused, but also the degree of polarization of the polarized images is diffused, and thus the implementation of stereoscopic images is impossible.

Some screens having a film structure, such as a film having no transmission layer, enabling transmittal of stereoscopic images, but such film screens generally have a thin-film structure and the flatness thereof is maintained only by adding separate frames and providing tension through a spring. However, there are disadvantages to such scenes in that deformation of the screen occurs due to climatic changes as time elapses and, more particularly, since the image displayed on a surface of the screen is diffused, the efficiency of transmission is less than 20%, the angle of polarization is diffused, and therefore the viewing angle becomes narrow, thereby making three-dimensional viewing uncomfortable.

For the above-described reasons, a screen having a thin film is not suitable for large screen structures or three-dimensional TV's because of limitations in frames and tension structures.

The present invention relates to a transmission screen configuration having a transmission layer greater than 1 mm, and which is suitable for use as a three-dimensional TV or a large screen.

As illustrated in FIGS. 1, 2(a) and 2(b), known stereoscopic images may be generated such that the images of left and right projectors P1 and P2 pass through left and right polarization filters R1 and L1, respectively, having polarization degrees of a symmetric angle, and wherein the left images R are transmitted only through the left polarization lens 5R of polarization glasses 5 and blocked through the right polarization lens 5L, and, in the same way, the right images L are transmitted only through the right polarization lens 5L of the polarization glasses and blocked through the left polarization lens 5R, thereby allowing the right images L to be viewed only by the right eye of a viewer and the left images R to be viewed only by the left eye of the viewer.

It is thus impossible to view the stereoscopic images without maintaining the polarization degrees of the left and right images as described above.

For use as conventional transmission screens, there are a variety of transmission screens, such as Fresnel type screens, diffusion material addition type screens, and scattering type screens, but it is impossible for a viewer to view stereoscopic images using such screens because the polarization degree of the images is diffused by the refractive index, the transmissivity, and the scattering rate when images are transmitted using such screens.

In particular, in a conventional transmission screen onto which diffusion material, such as silica, is added in order to diffuse images for screen functions, when images are transmitted, the polarization degree is also diffused, so that the polarization degrees of the left and right images R and L are reduced, and therefore, a double focused image is observed by a viewer, making viewing of stereoscopic images impossible.

SUMMARY OF THE INVENTION

The present invention relates to a structure of a transmission type screen having a transmission layer with a thickness of more than 1 mm, and which is suitable for stereoscopic type TV screens or large stereoscopic screens.

The present invention has been made keeping in mind the above problems occurring in the prior art, and considerations and objectives of the present invention are described below.

The invention comprises a method of allowing images to be imaged in a state in which a polarization degree is maintained.

First, the surface particle size of the incident surface 2 of a screen substrate 1 has to be suitable. The polarized images have to enter the incident surface 2 of the screen substrate 1 while possibly maintaining the polarization degree and while being transmitted through the transmission layer 4.

The conventional transmission screen has a low amount of incident light because the scattering rate of front and rear surfaces is high, and therefore the amount of transmitted light is low.

Second, the material of the transmission layer 4 has to have a proper refractive index p. (Hereinafter the reference to the refractive index is the d line having wavelength of 587.6 nm, that is, a yellow line).

All transmission medium have a refractive index.

As illustrated in FIG. 2(b), an angle ∠A at which images, passed through a left polarization filter R1 and polarized in left and right directions, are blocked by the right polarization lens 5L of a polarization glasses 5, is within a very small range of merely 1-3 degrees with respect to a refractive index of 1 for air.

Accordingly, when the refractive index s of plastic or glass used as the screen substrate is more than the above angle, the polarization degrees of the left and right images R and L deteriorate, thereby making the viewing of the stereoscopic images impossible.

Third, when images passed through the incident surface 2 of the screen substrate 1 are transmitted through the transmission layer 4 of the screen substrate 1, the transmissivity thereof must be proper.

Furthermore, since, in determining the transmissivity P, the contrast of images is important apart from the brightness thereof, transmission loss due to the pigment must be considered with regard to contrast if pigment having the color of smoke (blue or black) is used.

Fourth, images transmitted through the transmission layer 4 of screen substrate 1 hit the scattering surface, and are then scattered, so that images are formed, thereby implementing screen functions.

Therefore, when the surface particle size of the imaging surface 3 of the screen substrate 1 is too rough, the definition of the images degrades, and when the surface particle size is too fine, the light source of a projector is directly transmitted, so that a so-called hot-spot phenomenon in which some places are bright occurs.

Accordingly, the proper surface particle size of the imaging surface 3 must be determined, and the location at which the imaging surface 3 is arranged must be appropriate.

Since the imaging surface 3 is located at a place where images are scattered, the polarization degree of the images deteriorates if the polarization degree is scattered before being transmitted through the transmission layer 4, thereby making viewing of stereoscopic images impossible.

Fifth, when the above-described factors are organically taken into account and combined with respect to each other (i.e., interact and cooperate functionally together), the viewing of stereoscopic images is possible in a transmission type screen. When any one of the factors is lacking, the viewing of stereoscopic images is impossible in a transmission type screen.

In order to accomplish the above objects, according to the present invention, as illustrated in FIG. 3, the refractive index s of the transmission layer 4 of the screen substrate 1 is less than 1.55;

the transmissivity P is more than 60%;

the incident surface 2 of the screen substrate 1 has a gloss thereon;

the imaging surface 3 is constructed of particles having a mesh size of 40-400 at the location where the image is formed on the final surface of the transmission layer 4 through which images are transmitted; and the thickness of the entire screen, including the transmission layer 1, is more than 1 mm.

The reason why the refractive index s of the transmission layer 4 of the screen substrate 1 is less than 1.55 is described below. The range of a block angle ∠A according to polarization is 2 to 3 degrees with respect to the refractive index 1.0 for air and thus very small.

Therefore, at the refractive index 1.5, the range thereof is 0.5 to 1.0 degrees which is 50% of and smaller than the above range.

When the refractive index is more than 1.55, the range of ∠A becomes more than 2 to 3 degrees, so that the polarization degree is not maintained.

Therefore, the range of the block angle ∠A according to polarization is 2 to 3 degrees.

The reason for which the transmissivity is more than 60% is described below.

The efficiency of transmission of a conventional diffusion material screen is less than 20%.

When pigment having a smoke color, such as blue or black, is added in order to increase contrast, the transmissivity becomes lower.

Furthermore, a polarization filter transmits light up to 50%. When this is considered, the transmissivity is 3 times that of a conventional screen, that is, is more than 60%, which increases brightness compared to a conventional screen, thereby obtaining brightness and a polarization degree 3 times greater than the transmissivity of a conventional screen.

The reason why the incident surface 2 of the screen substrate 1 has a gloss surface is described below. The incident surface 2 of a conventional transmission screen scatters light, so that the amount of light incident thereto is very low.

In order to transmit projected images into the transmission layer 4 at a maximum, the surface particle size thereof is within a range of 800 to 4000 mesh although there is variation according to a required surface strength and with the surface being a gloss surface. The amount of incident light is more than 90%.

The surface particle size of the imaging surface 3 is within a range of 40 to 400 mesh, and formed where images are represented, that is, on the final surface of the screen substrate 1 at which images viewed by viewers are represented.

If the surface particle size is less than 40 mesh, the definition and brightness of images become rapidly degraded. If the surface particle size is more than 400 mesh, the scattering layer of light is very thin, so that a hot spot phenomenon according to which the light source of a projector is viewed by viewers occurs.

Therefore, the particle size of the imaging surface of 40 to 400 mesh enables imaging of images without hot spots. The magnitude of the particle size differs according to material and therefore is determined according to obtaining a material for images having no hot spot.

Furthermore, the imaging surface 3, formed on the final surface of the screen substrate 1, displays images without loss of polarization degree in the transmission layer 4, thereby increasing the three-dimensional effect.

Therefore, the incident surface 2 of the screen substrate 1 has a particle size of a gloss surface, and the images incident to the incident surface 2 are transmitted at a refractive index less than 1.55 and with a transmissivity of more than 60%, and are displayed on the imaging surface 3 which is the final surface.

In this way, polarized images are transmitted and imaged while maintaining the polarization degree, so that the three-dimensional effect is increased by two times.

According to the present invention, the incident surface 2 having a gloss surface enables projected images to be incident thereto by an amount of 2 times more than conventional screens. The transmission layer 4 having a refractive index 1.55 transmits the projected and polarized images while maintaining the polarization degree. The transmissivity of more than 60% is three times more than a conventional transmission screen having a transmissivity less than 20%, thereby increasing brightness and clarity. The final imaging surface 3 of 40 to 400 mesh enables transmitted images to be imaged without a hot spot.

Furthermore, the thickness of the transmission layer 4 including the imaging surface 3 is more than 1 mm, so that the screen is self-supported without requiring a separate frame or a tension member, and self-maintains flatness.

DETAILED DESCRIPTION OF THE PREFERRED EMBODIMENTS

First Embodiment

Figure 3:
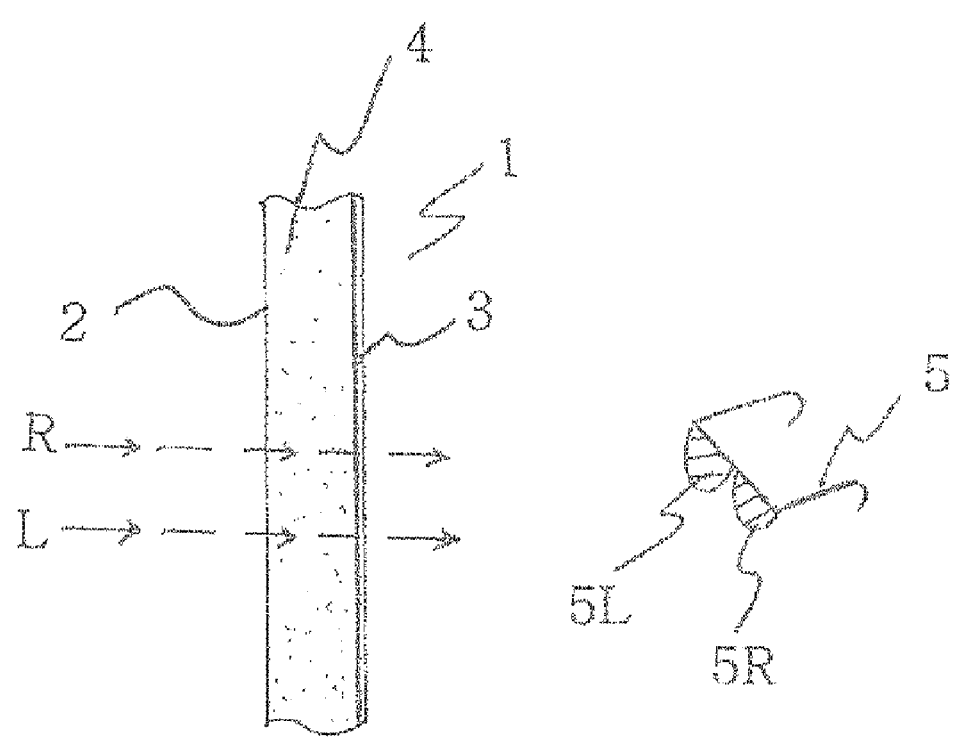
FIG. 3 is a diagram illustrating the construction and operation of the present invention.

FIG. 3 is a cross-sectional view of components of an embodiment of the present invention.

Figure 4:
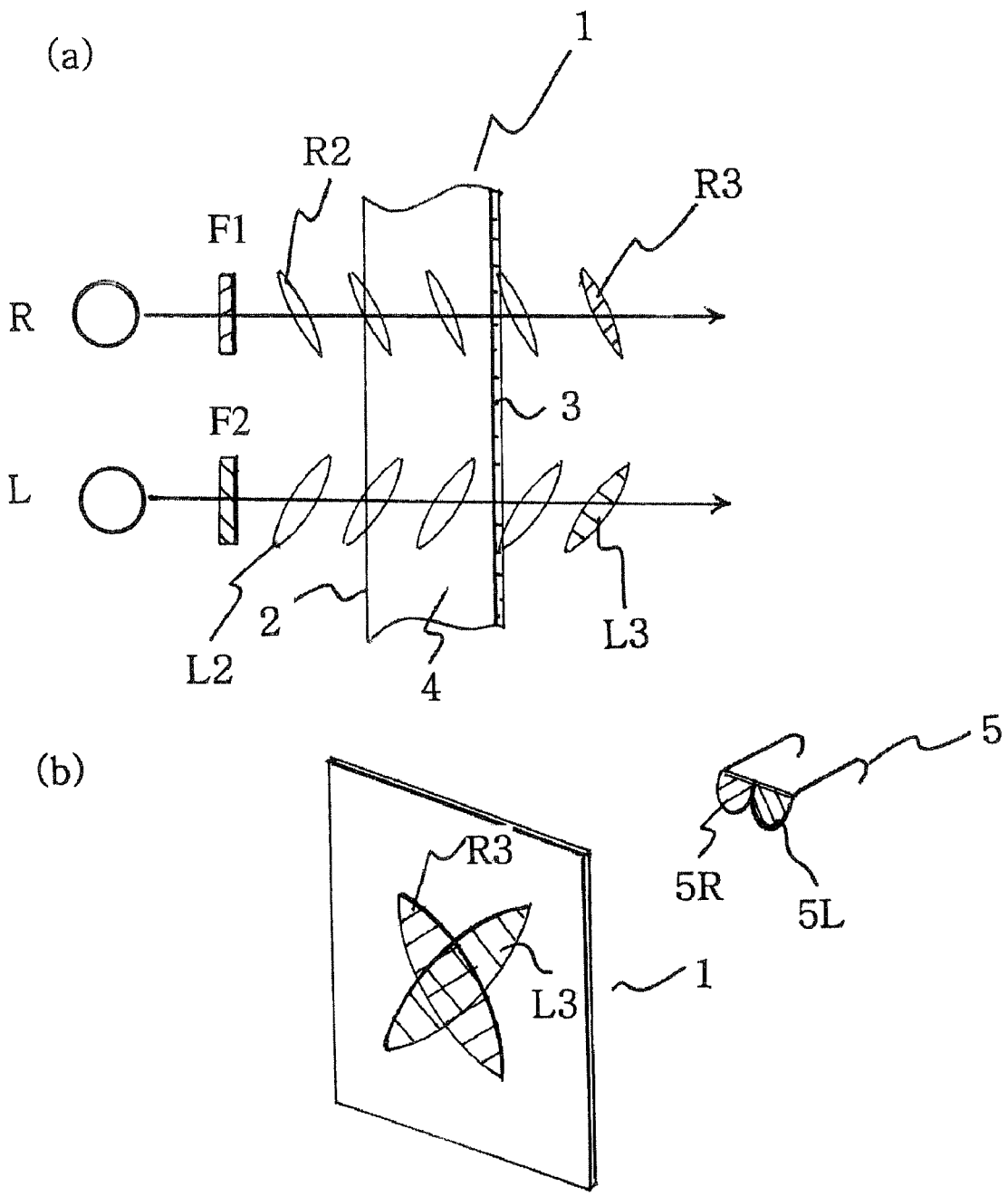
FIG. 4(a) is a diagram illustration polarization and transmission of images according to the present invention.
FIG. 4(b) is a diagram illustrating polarized images displayed on a screen substrate.

FIG. 4(a) is a view describing the effect of FIG. 3.

FIG. 4(b) is a view describing a state in which left and right images are imaged (displayed) on a screen.

The screen substrate of FIG. 3 according to the present invention has a refractive index s of 1.49.

The transmissivity p of the material is 90% to 95% by itself, but may be 85% when pigment having the color of smoke (i.e., blue or black) on the order of 1-4% is included, so that the entire color of the screen substrate become the color of smoke, thereby making a color transmitted from the rear surface more clear with respect to external (ambient) light.

When the rear surface of the screen substrate becomes dark, the clarity thereof increases with respect to external (ambient) light by two times or more.

Furthermore, the incident surface 2 of the screen substrate 1 has a gloss surface so that 85% of the images of right and left projectors P1 and P2 are incident onto the interior of the screen substrate 1.

The imaging surface 3 of the screen substrate 1 has a particle size of 100 mesh on the final surface thereof with respect to the traveling direction of the images projected on the screen substrate 1.

Therefore, according to the present invention, as illustrated in FIGS. 3 and 4(a), the left and right images R and L of the left and right projectors are projected in a polarized state by left and right polarization filters F1 and F2, so that 85% thereof are incident onto the incident surface 2 of the screen substrate, and with the degree of polarization maintained within a range of 2 to 3 degrees due to the refractive index s of 1.49, with more than 60% thereof being transmitted, so that right and left polarized images R3 and L3 are represented on the imaging surface 3 of the screen substrate 1 without a hot spot phenomenon as illustrated in FIG. 4(b).

Second Embodiment

Figure 5:
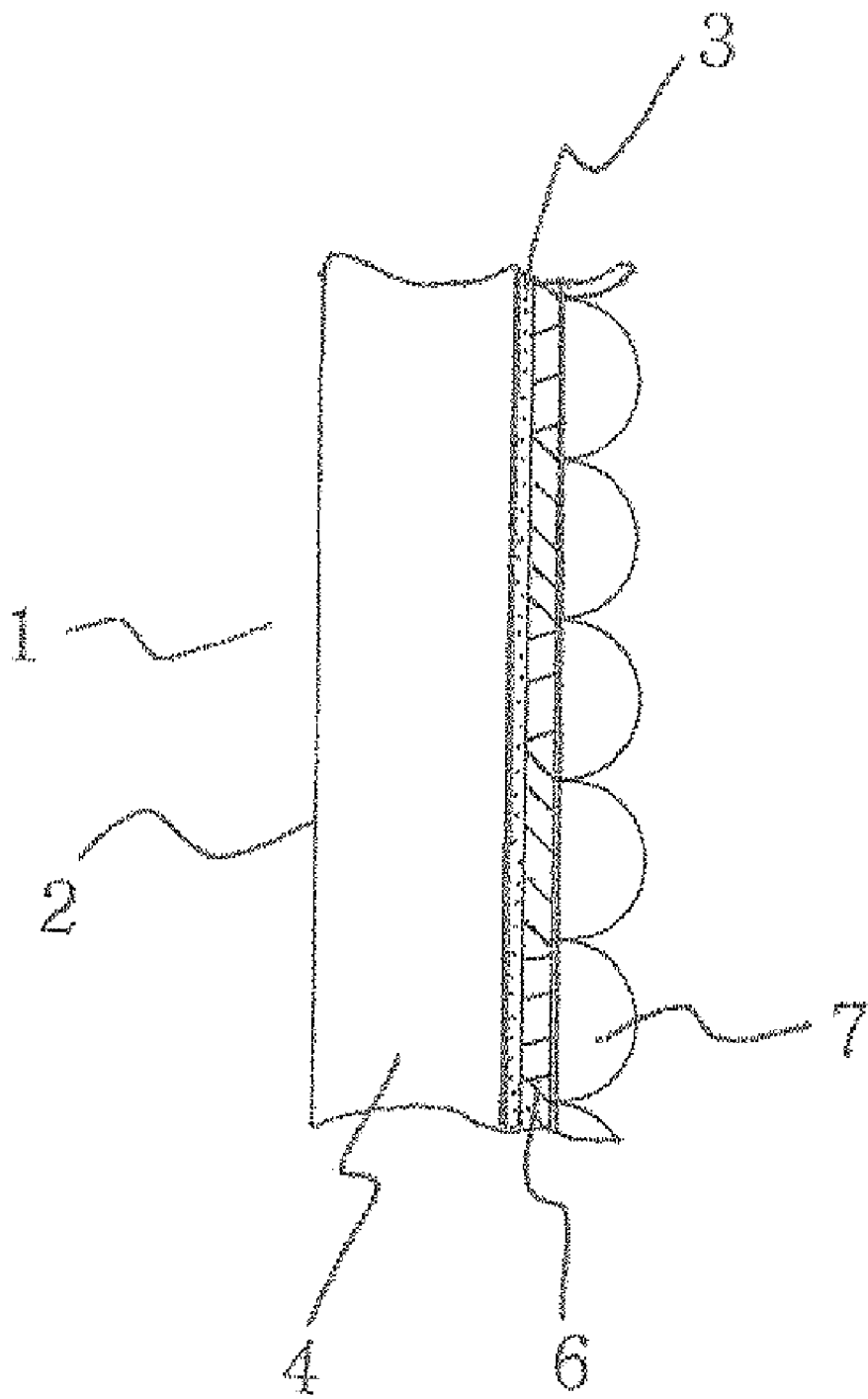
FIG. 5 is a diagram illustrating a second embodiment of the present invention.

As illustrated in FIG. 5, the present invention can include a polarization plate 6, having symmetric angles with respect to each other in upper and lower directions, on the imaging surface of the screen substrate 1; that is, the front surface of the imaging surface 2, and can define curved vertical lines 7 having the form of half-cylindrical lenses on the front surface thereof.

In this case, the refractive index s, and transmissivity p of the curved vertical line 7, and surface particle size of the incident surface 2 are identical to those of the screen substrate 1 according to the present invention.

Third Embodiment

The present invention may be further characterized in that the transmission layer 4 transmits polarized images without loss and at the same time, general images may be projected more brightly than conventional screens.

Figure 1:
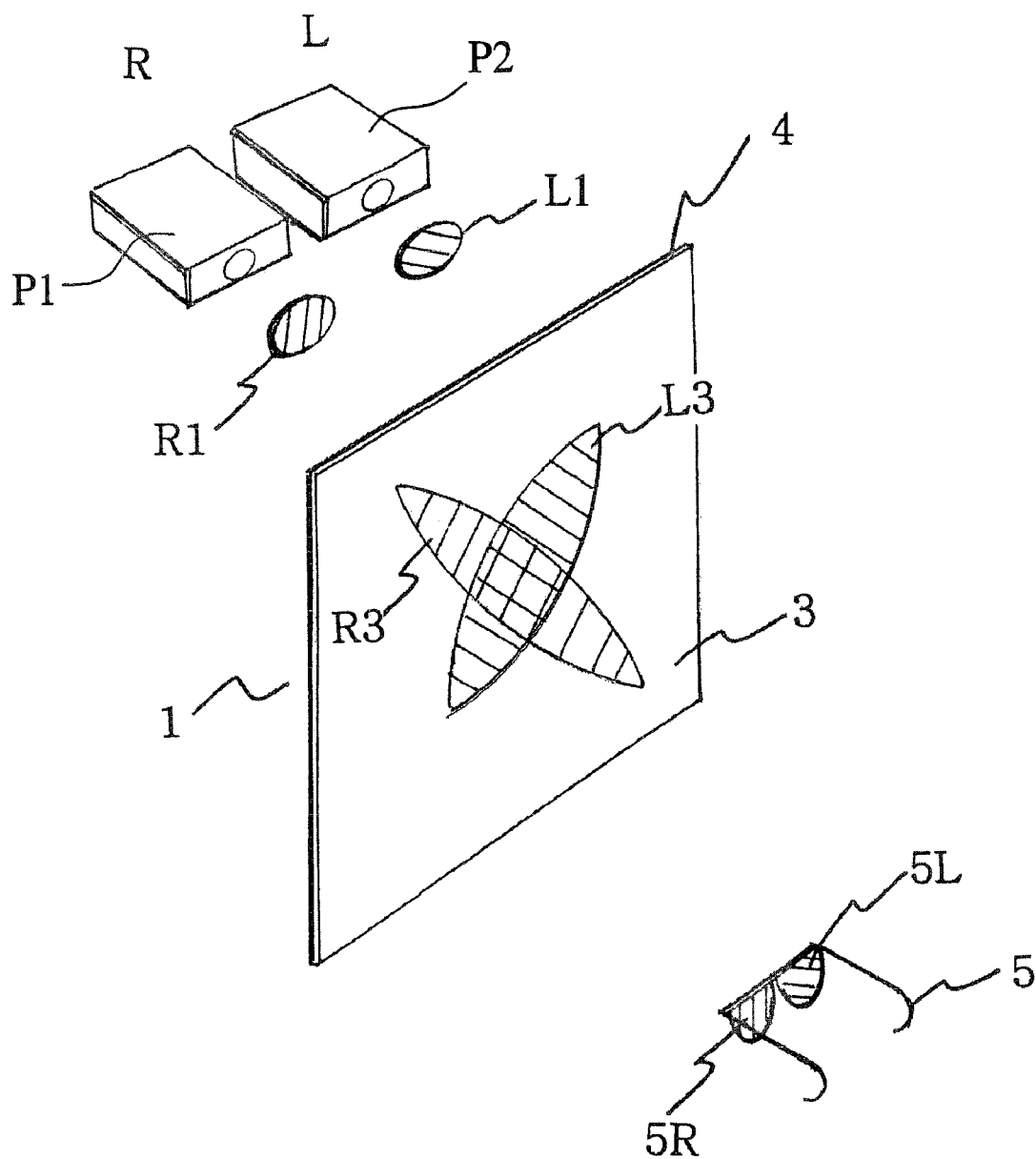
FIG. 1 is a diagram illustrating a basic known structure when stereoscopic images are viewed.
Figure 2:
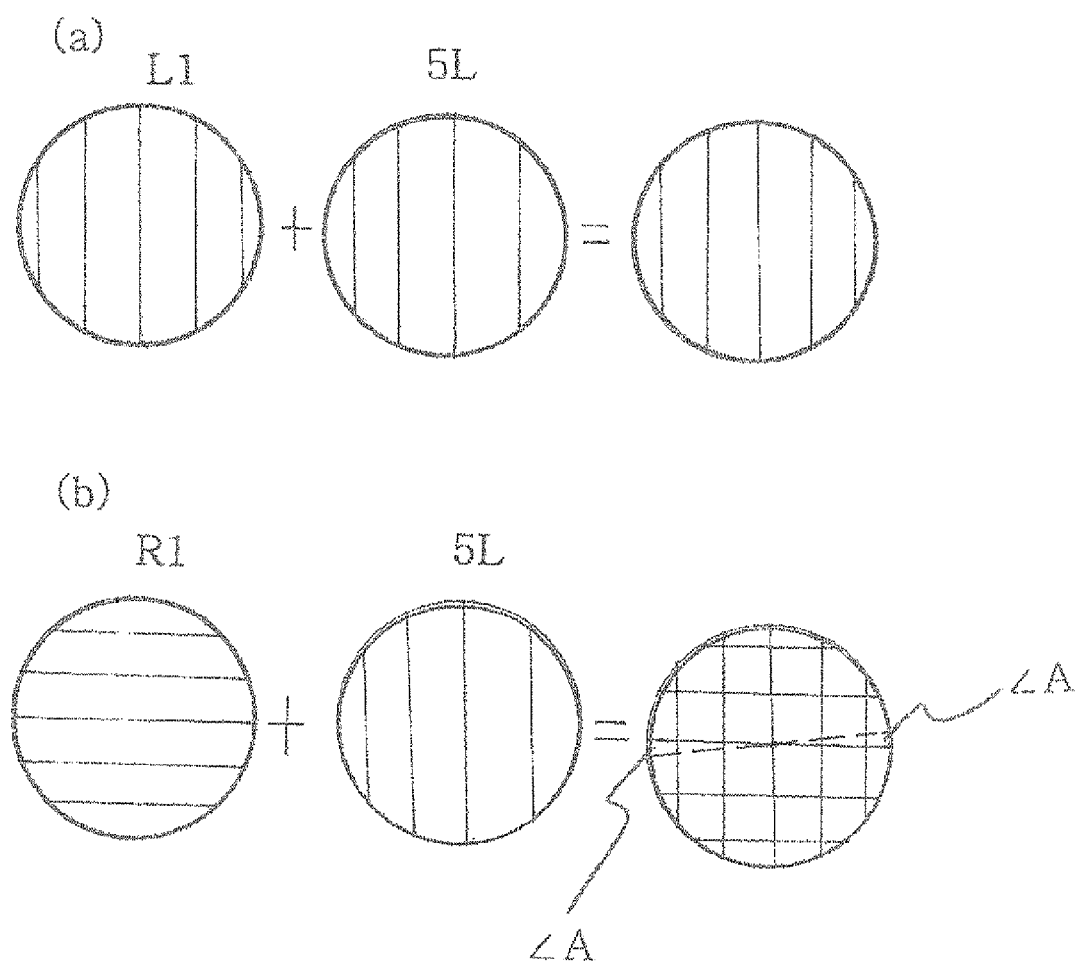
FIG. 2 is a diagram illustrating polarization in a conventional polarization plate.

That is, in FIG. 1, when among the left and right projectors p1 and p2, for example, the left projector p1 is selected, and the left polarization filter L1 in front thereof is moved in an upward or downward direction, images are projected onto a screen without the polarization filter and general images will be projected. Therefore, general images can be projected, and, if needed, general images or stereoscopic images may be selectively projected.

In such case, general images are viewable by viewers with transmissity and resultant light twice that of a conventional screen, thereby making such images twice as clear as compared to a conventional screen.

Therefore, the screen of the present invention is usable both as a high-definition transmission screen for general images and a transmission screen for 3D stereoscopic images.

What is claimed:

1. A transmission screen for stereoscopic images, comprising:
    a screen substrate comprising an incident surface, a transmission layer and an imaging surface;
    said incident surface having a gloss surface;
    said transmission layer having a refractive index s that is less than 1.55 with respect to a d line of 587 nm wavelength;
    a transmissivity p of the transmission layer is more than 60% and a thickness of the transmission layer is more than 1 mm;
    the imaging surface is arranged to receive polarized images to be transmitted through the screen; and
    the incident surface, transmission layer and imaging surface interact and cooperate functionally together for enabling viewing of stereoscopic images by allowing images to be imaged in a state in which a polarization degree is maintained.

2. The transmission screen according to claim 1, wherein pigment having the color of smoke is included in the transmission layer.

3. The transmission screen according to claim 1, wherein a half-cylindrical lens and a polarized plate are coupled to an entire surface of the imaging surface.

4. Method of using a transmission screen, comprising the steps of:
    providing the transmission screen according to claim 1; and
    projecting polarized images onto the incident surface of the transmission screen to form stereoscopic images on the imaging surface of the transmission screen.

5. The transmission screen according to claim 1, wherein said transmission layer has a refractive index s that is 1.49.

6. The transmission screen according to claim 1, wherein the imaging surface is constructed of particles having a mesh size of 40- 400.

* * * * *